Sept. 28, 1943.   C. T. RASMUSSEN ET AL   2,330,743
BEET LIFTER
Filed Aug. 28, 1941   2 Sheets-Sheet 1
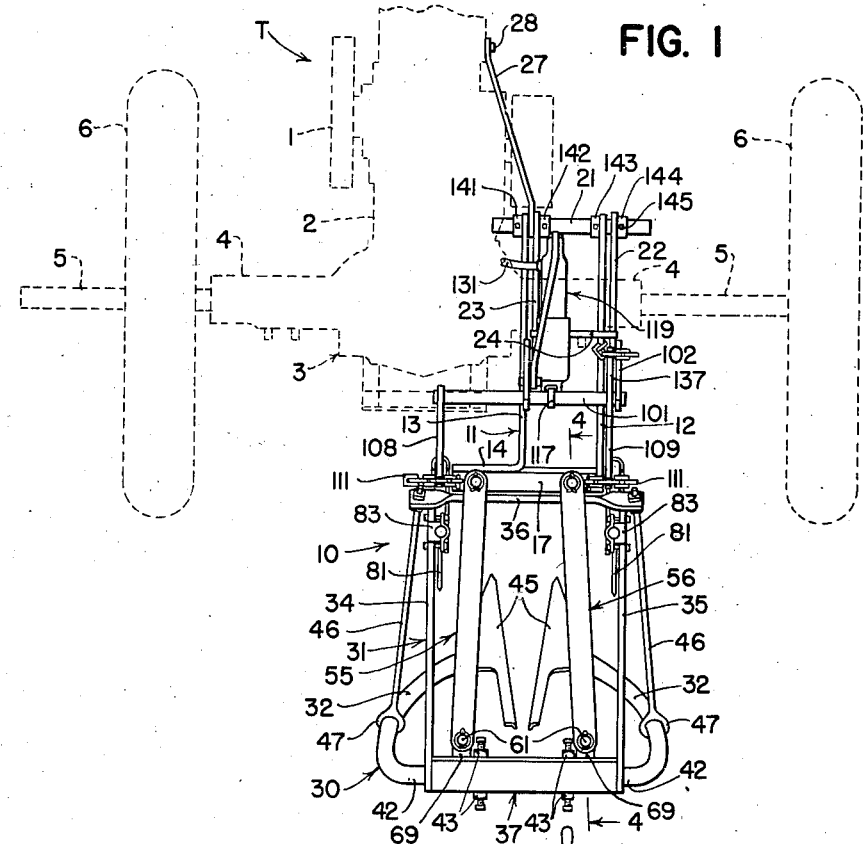
FIG. 1
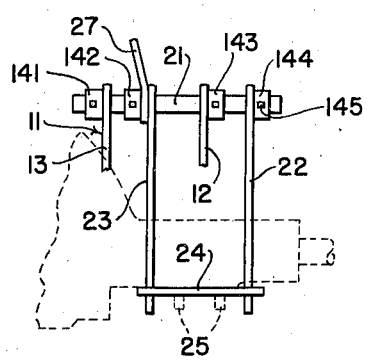
FIG. 7
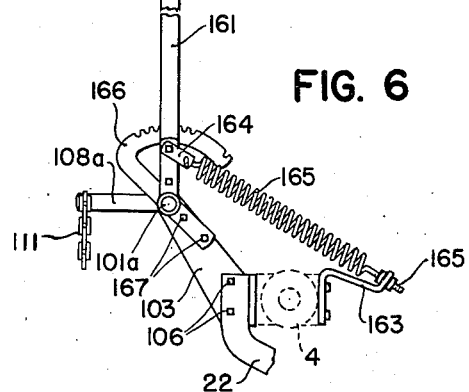
FIG. 6
INVENTORS
CLARENCE T. RASMUSSEN
& ROBERT D. GRIFF
BY
ATTORNEYS Sept. 28, 1943.  C. T. RASMUSSEN ET AL  2,330,743
BEET LIFTER
Filed Aug. 28, 1941   2 Sheets-Sheet 2

INVENTORS
CLARENCE T. RASMUSSEN
& ROBERT D. GRIFF
BY
ATTORNEYS

Patented Sept. 28, 1943

2,330,743

UNITED STATES PATENT OFFICE 2,330,743

BEET LIFTER

Clarence T. Rasmussen, Moline, and Robert D. Griff, Rock Island, Ill., assignors to Deere & Company, Moline, Ill., a corporation of Illinois Application August 28, 1941, Serial No. 408,586

19 Claims. (Cl. 55—106)

This invention relates generally to agricultural implements and more particularly to machines for harvesting sugar beets and other root crops.

The object and general nature of the present invention is the provision of an agricultural implement in which a tool is connected for lateral movement to draft means and in which the reaction of the soil pressure on the tool is transmitted, at least in part, to said draft means by means accommodating said lateral movement. A further feature of this invention is the provision of an agricultural implement which is particularly adapted to be mounted on a farm tractor, generally at the rear thereof so as to be capable of generally lateral movement about a virtual hitch point disposed substantially at the front end of the tractor. Another feature of this invention is the provision of a harvester, such as a beet puller or lifter, adapted for mounting on a farm tractor and especially adapted to accommodate variations in the lateral spacing or position of the row of plants being harvested. Further, it is a feature of this invention to provide improved means by which the lateral position of the implement, or at least the working portion thereof, may be conveniently and easily adjusted relative to the tractor. Another feature of this invention is the provision of improved lifting means whereby either a hand lift or a power lift may be accommodated. Still further, another feature of this invention is the provision of improved frame means, particularly adapted to be carried on a tractor in the proper laterally offset relation to accommodate disposing the beet engaging tools at one side of the tractor.

Another important feature of the present invention is the provision of an implement in which ground working tool means is mounted for lateral movement, with colter means movable laterally with the tool means.

These and other objects and advantages of the present invention will be apparent to those skilled in the art after a consideration of the following detailed description taken in conjunction with the accompanying drawings, in which Figure 1 is a plan view of a beet lifter of the tractor mounted integral type, in which the principles of the present invention have been incorporated;

Figure 6 is a fragmentary view of the hand lift arrangement which may be used instead of the power lift mechanism shown in Figure 2; and Figure 7 is a fragmentary view illustrating the manner in which implement draft frame may be adjusted laterally relative to the tractor.

Figure 2:
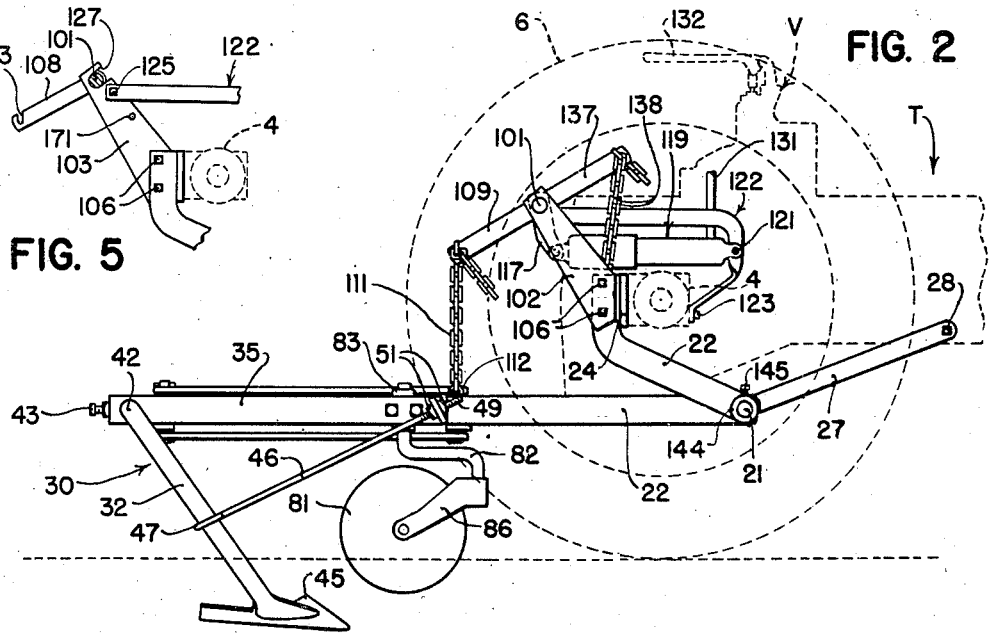
Figure 2 is a side view of the implement shown in Figure 1.

Referring now to the drawings, more particularly Figures 1 and 2, the tractor is indicated in its entirety by the reference character T and is of conventional construction, embodying a motor 1, a transmission case 2, a rear axle housing 3 having extensions 4 in which axle shafts 5 are journaled. Rear traction wheels 6 are fixed to the axle shafts 5 and may be adjusted along the latter to different positions, according to row spacing and other operating conditions.

Figure 3:
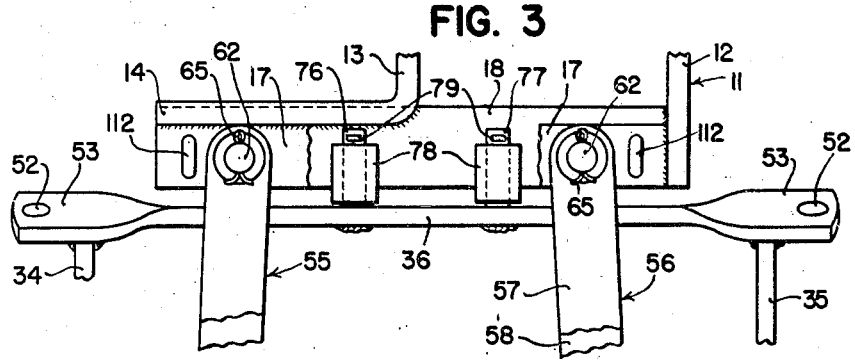
Figure 3 is an enlarged fragmentary plan view, showing the details of the swinging link connection between the tool frame and the draft frame.
Figure 4:
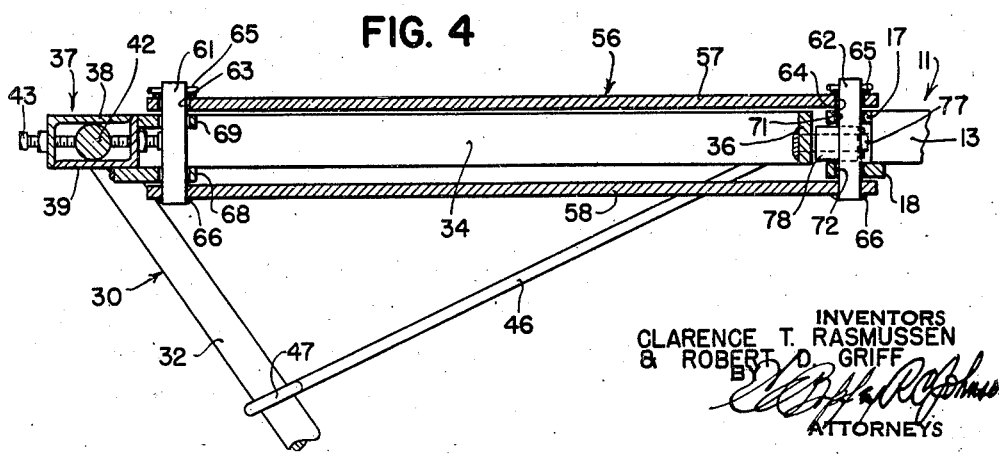
Figure 4 is a longitudinal section taken through the tool frame and associated parts, generally along the line 4—4 of Figure 1.

The implement which we have chosen to illustrate the principles of the present invention is a beet puller or lifter, indicated in its entirety by the reference numeral 10. The implement 10 includes a draft frame 11, preferably made up of a pair of generally longitudinally extending members 12 and 13, the latter having a laterally inwardly directed section 14 (Figures 1 and 3) which extends perpendicular to the main portion of the member 13. The frame 11 also includes a pair of transverse bars 17 and 18 disposed one above the other, the bar 18 being wider than the bar 17 as best shown in Figures 3 and 4. The ends of the bars 17 and 18 are welded to the rear end of the longitudinal bar 12 and to the laterally directed section 14 of the member 13 so as to form, in general, an L-shaped frame. The forward ends of the frame bars 12 and 13 are apertured to receive a pivot shaft 21 carried at the lower and forward ends of a pair of brackets 22 and 23, the rear ends of which are fixed, as by welding, to an attaching plate or bracket 24 having openings therein to receive the usual tractor stud bolts 25, provided on the tractor to receive implements and secure the same in place. As best shown in Figure 2 the ends of the brackets 22 and 23 extend downwardly and forwardly to points forward of the rear axle extensions 4. A brace 27 extends forwardly from the pivot shaft 21 and receives a bolt or other fastening 28 by which the brace is secured to the frame of the tractor T.

The operating unit of the implement is indicated in its entirety by the reference numeral 30 and comprises a frame 31 to which a pair of downwardly and forwardly extending beams 32 are connected. The implement frame 31 comprises a pair of longitudinal bars 34 and 35 which are connected, as by welding, at their forward ends to a front cross bar 36. The rear ends of the longitudinal bars 34 and 35 are fixed, as by welding, to a rear cross member 37, preferably in the form of a pair of angles 38 and 39 (Figure 4) welded together to form a hollow member of rectangular cross section in which the laterally inturned ends 42 of the beams 32 are disposed. The ends 42 are adapted to be inserted through openings in the ends of the bars 34 and 35 and into opposite ends of the hollow cross bar 37, in which they are fastened by set screws 43. The tool beams 32 are bent to extend forwardly, downwardly and inwardly, as best shown in Figure 1, and at their respective lower ends are provided with suitable beet engaging and lifting points or shoes 45. A pair of braces 46 are provided with eyes 47 at their rear ends disposed about the lower portions of the beams 32, as best shown in Figure 2, and the forward ends of the braces 46 are threaded, as at 49, to receive a pair of lock nuts 51. The threaded ends 49 of the braces 46 extend through openings 52 (Figure 3) formed in laterally outwardly extending angled sections 53 of the cross bar 36, the sections 53 of the bar 36 being bent so as to dispose the rod-receiving portions thereof in a plane substantially perpendicular to the braces 46. A beet puller or lifting unit of this general construction is shown in the prior Patent 2,119,835 to Miles H. Tuft, dated June 7, 1938, to which reference may be had if necessary.

The implement frame 31 is connected for generally laterally shifting movement with the main or draft frame 11 of the implement by means of a pair of nearly parallel link members 55 and 56. The link members 55 and 56 are preferably identical and hence a description of one will suffice. Referring now more particularly to Figures 3 and 4, the link member 56 is made up of a pair of vertically spaced strap members 57 and 58. A pair of studs or pivot pins, indicated by the reference numerals 61 and 62, is rigidly secured to the lower strap 58 by any suitable means, such as by welding 66, and the upper strap member 57 is apertured as at 63 and 64 so as to receive the upper ends of the studs 61 and 62. The latter members are apertured to receive cotters 65. The other link member 55 is of like construction.

In order to attach the link members 55 and 56 to the frame of the lifting unit, lugs 68 and 69 (Figure 4) are welded or otherwise secured to the cross member 37 at the rear of the implement. The lugs 68 and 69 are apertured to receive the studs 61, and since there are two link members 55 and 56, two sets of lugs or brackets 68, 69 are provided, as best shown in Figure 1. The forward ends of the links 55 and 56 are connected with the cross bars 17 and 18 of the main frame 11 by providing openings 71 and 72 in the cross members 17 and 18 of the frame 11, to receive the studs 62. It will be seen from Figure 4 that each of the link members 55 and 56 consists of a pair of vertically spaced strap members between which the lifting frame bar 36 extends, closely adjacent the front cross bars 17 and 18 of the draft frame 11. The front cross bar 36 of the implement frame 31 is apertured to receive a pair of pins or studs 76 and 77, which preferably are welded at their rear ends to the bar 36 (Figure 3). The pins 76 and 77 lie between the upper and lower cross bars (Figure 4) and receive a pair of rollers 78 which are held on the pins 76 and 77 in any suitable manner, as by cotters 79. The rollers 78 move laterally in between the bars 17 and 18 and bear against the upper surface of the latter when in operation.

It will be seen from Figure 1 that the frame 11 is laterally rigid with respect to the tractor since it is connected therewith at widely spaced points, and it also will be observed that the links 55 and 56 are approximately parallel but converge forwardly, lines extended through the link members 55 and 56 meeting substantially alongside the front wheel (not shown) of the tractor. The links 55 and 56 are connected at their forward ends to the cross bars 17 and 18 of the laterally rigid frame, and at their rear ends to the rear of the tool frame 31, by virtue of which construction the tool unit 30 swings generally laterally of the tractor about a virtual pivot disposed well toward the front of the tractor. This has the same effect as a long hitch, enabling the beet lifter to swing laterally from one side of the row to the other as may be necessary if the row is crooked, or such construction may serve to accommodate any momentary lateral shifting of the tractor, as may occur when steering the same down a row of beets.

Rolling colters 81 are mounted on laterally swingable colter brackets 82 that are securely fixed, as by clamps 83, to the forward ends of the frame side bars 34 and 35. Each colter 81 is mounted for rotation in a colter yoke 86 that is connected by any suitable means to the lower end of the associated colter bracket 82. Since the colters are fixed directly to the laterally shiftable frame 31 which carries the beet lifting tools 45, it will be seen that laterally shifting movement of the tool frame and the tools will also cause a lateral shifting movement of the colters so that the latter are always in the proper position to sever overhanging tops and the like in order to facilitate loosening the beets.

Figure 5:
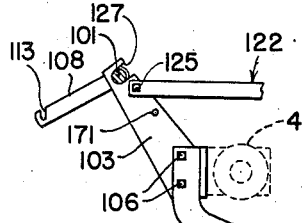
Figure 5 is a fragmentary view of the left hand tractor-carried supporting bracket on which the rockable lifting shaft is pivoted.

The main implement frame 11, carrying with it the laterally shiftable tool frame 31, may be raised and lowered by suitable mechanism mounted on the tractor. Referring now more particularly to Figure 2, a rock shaft 101 is supported for rocking movement in a pair of brackets 102 (Figure 2) and 103 (Figure 5) which are secured by bolts 106 to the upper end of the associated brackets 22 and 23. The brackets 102 and 103 extend upwardly and rearwardly and a pair of lifting arms 108 and 109 are secured to the ends of the rock shaft 101. A pair of lifting chains 111 are connected between the outer rear ends of the lifting arms 108 and 109 and at their lower ends are connected by eye bolts 112 (Figure 3) to the cross members 17 of the draft frame 11. As best shown in Figure 5, the outer or rear end of each of the arms 108 and 109 is provided with a narrow slot 113 opening upwardly and formed so that any one of the links of the associated lifting chain 111 may be disposed therein. By taking the link out of the slot 113 and disposing another link therein, the effective length of the chain 111 may be varied as desired.

An arm 117 is fixed, as by welding, to the intermediate portion of the rock shaft 101 and at its lower end is pivoted to one end of a hydraulic piston and cylinder unit 119, the other end of which is pivoted as at 121 to a generally U-shaped bracket 122. The lower end of the latter is bolted as at 123 (Figure 2), to the forward side of the right hand rear axle extension 4. The rear end of the link 122 is bolted at 125 to the upper end of the left bracket 103 (Figure 5).

From Figure 5 it will be noted that the upper end of the bracket 103 is provided with a slot 127 in which the left end of the rock shaft 101 is disposed. The upper end of the right hand bracket 102 is apertured, and the purpose of providing an aperture in one of the brackets and a slot in the other is to facilitate the installation of the rock shaft 101 in the brackets 102 and 103 after the lifting arms 108 and 109 and the cylinder arm 117 have been welded to the shaft 101. In placing the rock shaft 101 in position, the outer end is first disposed in the opening of the upper end of the right hand bracket 102, and then the left end of the rock shaft 101 is passed into the slot 127. The rock shaft 101 is normally held in place since the weight of the tools and other parts acting thereon tends to press the rock shaft 101 to lower end of the slot 127.

The hydraulic unit 119 reacts at 121 against the brace or bracket 112, and since the latter is bolted at 125 (Figure 5) to the upper end of the left hand bracket 103, it will be seen that the forces involved when fluid is admitted to the cylinder under pressure form what may be termed a closed circuit; that is, the bracket 122 transmits the lifting reaction to the bracket 103 substantially at or adjacent the point where the driven member, namely, the rock shaft 101, is carried. A fluid conduit 131 extends from the hydraulic cylinder unit 119 to a valve structure V carried by and forming a part of the tractor. Since the present invention is not particularly concerned with the details of the valve mechanism itself, the same has been illustrated only in outline. It will be seen that the valve mechanism includes a valve lever 132, and moving the latter into one position serves to direct fluid under pressure into the cylinder 119 while moving the lever 132 in the other direction serves to release fluid from the cylinder 119. From Figure 2 it will be seen that when fluid is directed into the cylinder 119 the shaft 101 is rocked in a clockwise direction, which acts through the arms 108 and 109 and the associated lifting chains 111 to raise the main frame 11 and the implement unit itself about the axis defined by the pivot shaft 21. Moving the valve lever 132 into the other position serves to permit the implement to lower. Movement of the latter in a lowered direction is limited by adjustable mechanism which includes an arm 137 mounted on the rock shaft 101 and having a slot in the outer end, similar to the slot 113 in the arm 108 (Figure 5). A chain 138 is disposed with one of its links in the slot in the outer end of the arm 117 and the lower end of the chain 138 is anchored to a part on the tractor, such as the upper bolt 106 (Figure 2). Various links of the chain 138 may be disposed in the slot in the outer end of the arm 137 whereby the lower limit of movement in the implement may be adjusted.

As best shown in Figure 1, I have shown my invention as embodied in a one row implement, and the provision of the L-shaped frame 11 makes it possible to connect the implement to brackets 22 and 23, which are fixed to the right side of the main body or longitudinal axis of the tractor, yet have the implement unit in proper position, spaced laterally from the center line of the tractor by a distance about equal to one-half the row spacing. It is customary when pulling beets with a tractor outfit in which the tractor is of the tricycle three-wheel type to adjust one of the rear wheels 6 so that it is disposed fairly close to the side of the tractor, accommodating a row of plants between the tractor wheel and the row being worked, and to adjust the other tractor wheel so that it spans two rows. This disposes the center line of the tractor to one side of the row being lifted while the disposition of one tractor wheel spanning two rows, as just stated, results in centering the draft load midway between the rear tractor wheels. For this purpose, therefore, the provision of the L-shaped main draft frame is of particular importance, permitting the disposition of the lifting tools 45 in exactly the correct lateral position while accommodating a draft connection between the implement and the tractor at one side of the latter where there is more room to mount the attaching brackets and other parts, without requiring other brackets, braces or the like extending underneath the tractor or fastened to the other side, as is shown in some prior art implements.

In order to provide for different row widths, the pivot shaft 21, which is supported forward of the rear axle 4 by the downwardly and forwardly extending brackets 22 and 23, is made of extended length, and a plurality of four collars 141, 142, 143 and 144 are provided, each having a set screw 145 by which the collar may be secured in laterally fixed position to the pivot shaft 121. For an average row spacing, the parts are placed as shown in Figure 1, with the collars 141 and 144 disposed in laterally outer positions, the first in contact with the forward end of the frame bar 13 and the latter collar in contact with the laterally outer side of the laterally outer brace 22. The other collars 142 and 143 are disposed, respectively, laterally outwardly of the bracket 23 and laterally inwardly of the forward end of the frame bar 12. If it is desired to move the implement 10 laterally inwardly relative to the tractor, the collars are so placed that the frame bars 12 and 13 are disposed in the positions shown in Figure 7, the pivot shaft 21 being shifted laterally inwardly, and the collars 141 and 143 being disposed against the forward ends of the frame bars 12 and 13, while the other collars 142 and 144 are disposed at opposite sides of the brackets 22 and 23, thus holding the implement in a laterally inward position. The implement may be moved to its other position by shifting the pivot shaft laterally outwardly and placing the frame bars 12 and 13 laterally outwardly, respectively, of the brackets 22 and 23, in substantially the same manner they are as shown in Figure 7, laterally inwardly of the brackets 22 and 23.

The operation of the invention as described above is substantially as follows:

By moving the valve lever 132 into a lowered position, the fluid in the cylinder 119 is released and the weight of the implement and the suck of the shoes 45 cause the latter to enter the ground, such as to the position shown in Figure 2. The tractor is then driven along the rows of beets, the rear tractor wheels spanning a total of three rows, the middle row being worked by beet lifting unit 30. Since the lifting shoes 45 and associated frame are connected to the main draft frame by approximately parallel links, the unit is free to swing laterally to conform to variations in the straightness of the row of beets being pulled; likewise, variations in the position of the tractor relative to the row, as may occur when steering the tractor or for other reasons, are accommodated, the beet lifting unit swinging generally about a virtual pivot alongside the front end of the tractor. This provides a long easy swing so that the lifting unit is free to accommodate lateral variations of the beet row relative to the tractor, but nevertheless the lifting unit tends normally to return to a central position as shown in Figure 1. At the end of the row, the operator raises the valve 132, which causes the fluid to be forced into the cylinder 119. The extension of the piston in the cylinder serves to swing the arm 117 and the pivot shaft 101 in a clockwise direction (Figure 2), exerting a lifting force through both lifting arms 108 and 109 and raising the draft frame of the implement unit about the axis of the pivot shaft 121.

During both the lateral shifting movement of the implement frame and the raising of the latter and the main frame, the colters 81 move with the implement frame. Likewise, when the collars 141, 144 and the shaft 21 are adjusted to dispose the implement in the different lateral positions relative to the tractor to accommodate various row spacings, no adjustment of the colters is necessary, since the latter remain in fixed position on the laterally shiftable implement frame 31 and are adjusted laterally with the latter. The extent of raising movement may be adjusted by placing different links of the chains 111 in the slots 113 in the outer ends of the lifting arms 108 and 109, and likewise, the lowered position, as determined by the chain 138 when the fluid in the cylinder 119 is released, may be adjusted by placing different links of the chain 138 in the slot in the outer end of the arm 137. The latter, as shown in Figure 1, may be an extension of the lifting arm 109, if desired.

When in operating position, the pressure of the soil due to the forward travel of the outfit against the shoes 45 is sustained by the rigid tool frame 31 bearing down on the draft frame 11, more or less at a forward point relative to the tools, and by the rigid lower link members 58, each of which includes the studs 61 and 62 that are welded thereto. These link members therefore serve as rigid bails which are laterally swingable but which are quite rigid against vertical displacement. The lateral movement of the implement frame is guided by the rollers 78 moving between the upper and lower cross members 17 and 18. The reaction of the soil pressure against the shoes causes the rollers to bear against the lower member 18, but the latter freely accommodates lateral movement of the implement frame. Due to the fact that the links 55 and 56 are not exactly parallel, the implement frame 31 does not have exactly lateral movement; instead, it swings generally about a virtual hitch point adjacent the forward end of the tractor. When changing the position of the draft frame 14 of the implement from one side to the other, relative to the brackets 22 and 23 (see Figures 1 and 7), the lifting chains 118 and the depth limit chain 138 may be removed from the associated arms and disposed at the respective other sides thereof, if desired or necessary. As best shown in Figure 2, the pivot shaft 21 is disposed well forward of the tractor rear axle so as to secure the proper line of draft and to secure adequate penetration of the tools.

Figure 6 shows a hand lift attachment which may be used in place of the power actuated cylinder 119 and associated parts shown in Figure 2. Referring now to Figure 6, a rock shaft 101a having arms corresponding to arms 108 and 109, the arm 108a being shown in Figure 6, may be rockably mounted on the brackets 102 and 103 in the same manner as the rock shaft 101. The rock shaft 101a has a hand lever 161 secured thereto, and a bracket 163 is adapted to be bolted to the front side of the rear axle extension 4 in place of the strap 122 (Figure 2). A link 164 is connected to the hand lever 161 and receives one end of an assisting spring 165, the front end of which is adjustably connected, as at 165, to the front of the bracket 163. A sector 166 is bolted at 167 to the bracket 103, and the hand lever 161 has cooperating detent mechanism (not shown) cooperating with the teeth of the sector 166. By releasing the detent mechanism and swinging the hand lever 161 in one direction or the other, the beet lifting tools and associated parts may be raised and lowered.

As best shown in Figure 5, the bracket 103 is provided with two holes 171 to receive the bolts 167 for mounting the hand lift sector 166. When using the power lift, one of the holes 171 is used to receive the bolts 125 which connects the rear end of the cylinder anchoring strap or bracket 122 to the left hand bracket 103. The provision of the slot 127 makes it easy and convenient to interchange the lifting rock shaft 101 and 101a, if desired, and also makes it easy and convenient to assemble these parts during manufacture or initial setting up of the implement.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. An agricultural implement adapted to be connected with a pulling vehicle, comprising a draft frame adapted to be connected with said vehicle, a ground working tool, a pair of generally horizontal laterally spaced draft links connecting said tool with said draft frame, and forwardly extending rigid means connected with said tool and slidably connected with said draft frame, said rigid means reacting against said draft frame for holding said tool in position.

2. An implement of the tractor mounted type, comprising a frame unit adapted to be pivotally connected with said tractor for vertical swinging movement but restrained against lateral movement relative to the tractor, a ground engaging unit, and a pair of generally longitudinally extending draft transmitting link means pivoted at their forward ends to one of said units and at their other ends to the other unit, said pivots being generally vertical so as to connect said ground engaging unit for lateral movement relative to said frame unit.

3. An implement of the tractor mounted type, comprising a frame unit adapted to be pivotally connected with said tractor for vertical swinging movement but restrained against lateral movement relative to the tractor, a ground engaging unit, a pair of generally longitudinally extending draft transmitting links pivoted at their forward ends to one of said units and at their other ends to the other unit, so as to connect said ground engaging unit for lateral movement relative to said frame unit, and means to prevent vertical displacement of said ground engaging unit relative to said frame unit.

4. An implement of the tractor mounted type, comprising a frame unit adapted to be pivotally connected with said tractor for vertical swinging movement but restrained against lateral movement relative to the tractor, a ground engaging unit, and a pair of generally longitudinally extending draft transmitting links connected at their forward ends to the rear portion of said frame unit and at their rear ends to the rear portion of said ground engaging unit on substantially vertical pivot axes, so as to connect said latter unit for lateral movement relative to said frame unit.

5. An implement comprising draft means, ground engaging tool means, a part rigid with said tool means and extending forwardly, means connecting said tool means with said draft means and accommodating generally lateral movement of the tool means relative to the draft means, and means whereby the forward portion of said rigid part bears against said draft means at a position spaced ahead of the draft connection with said tool means, while accommodating the lateral movement of said tool means.

6. A one-row beet lifter comprising the combination with a tractor of the tricycle type having central front wheel means and wide spread rear wheel means including a rear axle, of a substantially L-shaped frame having its longitudinal portion connected with said rear axle at one side of the tractor and its transverse portion disposed laterally inwardly, and a beet lifting unit connected with said L-shaped frame so as to be disposed close to the line of travel of the tractor front wheel means at said one side of the tractor.

7. A one-row beet lifter comprising the combination with a tractor of the tricycle type having central front wheel means and wide spread rear wheel means including a rear axle, of a substantially L-shaped frame having its longitudinal portion connected with said rear axle at one side of the tractor and its transverse portion disposed laterally inwardly, a beet lifting unit, and means including laterally swingable link means connecting said unit with said L-shaped frame so as to be disposed close to the line of travel of the tractor front wheel means at said one side of the tractor.

8. A beet lifter comprising a supporting frame adapted to pass along a row of beets to be lifted, a beet lifting frame having plant-engaging lifting means, means connecting said frames and accommodating lateral movement of said lifting frame relative to said supporting frame, and cooperating means carried by said frames for guiding the lifting frame in its lateral movement relative to the supporting frame.

9. An agricultural implement comprising a supporting frame adapted to pass along a row of plants, a tool frame having tool means, horizontally swingable, longitudinally extending link means connecting the rear part of said tool frame with said supporting frame and arranged to provide for generally lateral movement of said tool frame relative to said supporting frame, and cooperating means on said frames for guiding said tool frame in its lateral movement relative to the supporting frame.

10. An agricultural implement of the tractor mounted type, comprising a draft frame secured to said tractor for vertical movement but restrained against lateral movement, a tool unit including a frame connected with said draft frame for lateral movement relative thereto, and colters secured to said tool frame for lateral movement therewith relative to said draft frame.

11. An agricultural implement comprising means serving as a supporting frame, tool means including a tool frame, generally horizontal laterally swingable links connecting said frames, and colter means carried by said tool frame forward of said tool means and shiftable laterally relative to said supporting frame with said tool frame.

12. An agricultural implement of the integral type adapted to be mounted on a tractor, comprising a bracket, means securing the bracket rigidly to the tractor, a frame pivoted to said bracket for generally vertical movement relative to the tractor, a tool unit, and means securing said unit with said frame to swing vertically therewith and to move laterally relative thereto.

13. A beet lifter for attachment to a tractor, comprising a bracket adapted to be secured to the rear axle of the tractor and having a pair of forwardly extending parts disposed in laterally spaced apart relation, a beet lifting unit including a pair of forwardly extending parts also disposed in laterally spaced apart relation, the spacing corresponding to the spacing of said first mentioned forwardly extending parts, and means pivoting the forwardly extending parts of said lifting unit to the forwardly extending parts of said bracket, said means including means accommodating the optional disposition of said lifting unit parts on one side or the other of said bracket parts, respectively, so as to vary the lateral position of the lifting unit relative to the tractor supported bracket.

14. In an agricultural implement, bracket means including a pair of apertured spaced apart sections, an implement frame also including a plurality of apertured spaced apart sections, a pivot shaft removably secured in the apertures of said sections for connecting the implement frame to said bracket means, optionally on one side or the other of the latter to secure different positions of the implement frame and in a plurality of positions on at least one side of said bracket means, and means for securing the pivot shaft in different positions in the bracket means to accommodate different positions of the implement frame.

15. An agricultural implement comprising means serving as a supporting frame, a tool unit, means connecting said tool unit with said supporting frame for lateral movement relative thereto, and cooperating means on said frame and said unit separate from said connecting means for guiding the latter in its lateral movement relative to the supporting frame.

16. A tractor mounted beet lifter of the integral type, comprising a lifter frame having beet lifting tool means, means for gauging the depth of operation of said tool means from the tractor and accommodating generally lateral movement relative to the tractor, and draft transmitting means connecting said frame with the rear portion of the tractor and causing said lateral movement to take place about a virtual hitch point adjacent the front of the tractor.

17. An implement comprising a mobile frame, a ground working unit including a generally horizontal, longitudinally extending tool carrying frame, draft means mounted on said mobile frame and including a pair of laterally swingable, longitudinally extending links pivotally connected to said tool carrying frame adjacent the rear end thereof on generally vertical axes, the forward end of said tool carrying frame disposed to bear upon said draft means and slide laterally upon said bearing.

18. The combination defined in claim 17, further characterized in that said draft means includes transverse track means, and said tool carrying frame is provided with rollers at its forward end adapted to engage said track means as said tool carrying frame shifts laterally.

19. The combination defined in claim 17, further characterized in that said links are disposed in forwardly converging relation on lines intersecting adjacent the forward end of said mobile frame.

CLARENCE T. RASMUSSEN.
ROBERT D. GRIFF.